United States Patent
Tanaka

(10) Patent No.: US 10,756,356 B2
(45) Date of Patent: Aug. 25, 2020

(54) MANUFACTURING METHOD OF SEPARATOR FOR FUEL CELL

(71) Applicant: TOYOTA JIDOSHA KABUSHIKI KAISHA, Toyota-shi, Aichi-ken (JP)

(72) Inventor: Hideaki Tanaka, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/050,331

(22) Filed: Jul. 31, 2018

(65) Prior Publication Data

US 2019/0044161 A1 Feb. 7, 2019

(30) Foreign Application Priority Data

Aug. 4, 2017 (JP) .................. 2017-152031

(51) Int. Cl.
*H01M 8/0206* (2016.01)
*H01M 8/0221* (2016.01)
(Continued)

(52) U.S. Cl.
CPC ......... *H01M 8/0254* (2013.01); *H01M 2/145* (2013.01); *H01M 8/0206* (2013.01);
(Continued)

(58) Field of Classification Search
None
See application file for complete search history.

(56) References Cited

U.S. PATENT DOCUMENTS 6,490,778 B1 * 12/2002 Funatsu .................. B21C 37/02
29/557
2006/0280992 A1 12/2006 Miyagawa
(Continued)

FOREIGN PATENT DOCUMENTS

EP 1 667 262 A1 6/2006
JP 2003-297383 10/2003
(Continued)

OTHER PUBLICATIONS

Extended European search report issued in European patent application No. 18178325.9 dated Dec. 11, 2018.
(Continued)

*Primary Examiner* — Haroon S. Sheikh
(74) *Attorney, Agent, or Firm* — Finnegan, Henderson, Farabow, Garrett & Dunner, LLP

(57) ABSTRACT

A manufacturing method of a separator for a fuel cell, including: preparing a first die including: a first convex surface and a first concave surface; and a first side surface connected between the first convex surface and the first concave surface; preparing a second die including: a second concave surface and a second convex surface respectively facing the first convex surface and the first concave surface; and a second side surface facing the first side surface and connected between the second concave surface and the second convex surface; preparing a metal plate having a flat plate shape, and two electro-conductive resin sheets; and forming a flow channel in the metal plate and the two electro-conductive resin sheets by hot pressing with the first and second dies.

7 Claims, 10 Drawing Sheets

(51) Int. Cl.
*H01M 8/0228* (2016.01)
*H01M 8/0254* (2016.01)
*H01M 8/0258* (2016.01)
*H01M 2/14* (2006.01)
*H01M 8/0202* (2016.01)

(52) U.S. Cl.
CPC ....... *H01M 8/0221* (2013.01); *H01M 8/0228* (2013.01); *H01M 8/0258* (2013.01); *H01M 8/0269* (2013.01)

(56) References Cited

U.S. PATENT DOCUMENTS

| | | | |
|---|---|---|---|
| 2007/0212589 | A1 | 9/2007 | Kobuchi et al. |
| 2007/0298308 | A1* | 12/2007 | Yamamoto .......... H01M 8/0228 429/437 |
| 2010/0239957 | A1* | 9/2010 | Yamamoto .......... H01M 8/0254 429/514 |
| 2011/0123904 | A1 | 5/2011 | Fujimura et al. |
| 2016/0064766 | A1* | 3/2016 | Hashimoto ......... H01M 8/2485 429/460 |
| 2016/0129491 | A1 | 5/2016 | Taguchi et al. |

FOREIGN PATENT DOCUMENTS

| | | |
|---|---|---|
| JP | 2003-303597 | 10/2003 |
| JP | 2005-293877 | 10/2005 |
| JP | 2005-322433 A | 11/2005 |
| JP | 2006-012712 | 1/2006 |
| JP | 2006-120497 A | 5/2006 |
| JP | 2006-228638 | 8/2006 |
| JP | 4072371 | 1/2008 |
| JP | 2008-282728 A | 11/2008 |
| JP | 2011-113806 A | 6/2011 |
| JP | 4975262 B | 7/2012 |
| JP | 2012-204118 | 10/2012 |
| JP | 2013-157093 A | 8/2013 |
| JP | 2016-110724 | 6/2016 |

OTHER PUBLICATIONS

Extended European search report issued in European patent application No. 18177357.3 dated Dec. 11, 2018.

* cited by examiner

FIG. 4A
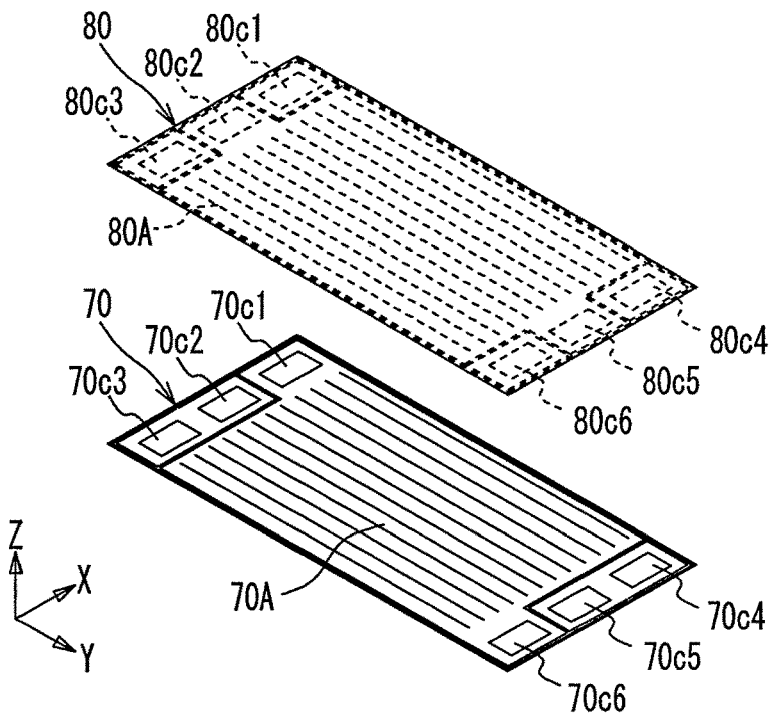
FIG. 4B
FIG. 4C
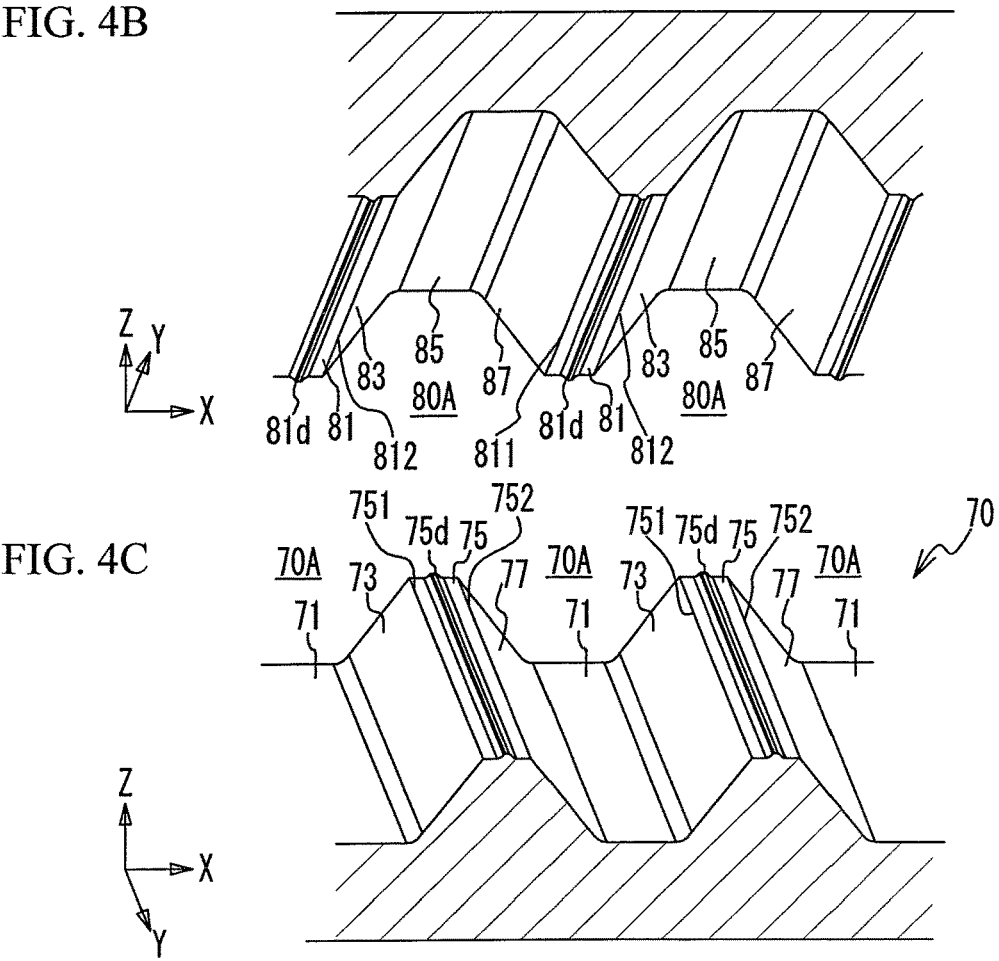

MANUFACTURING METHOD OF SEPARATOR FOR FUEL CELL

CROSS-REFERENCE TO RELATED APPLICATION

This application is based upon and claims the benefit of priority of the prior Japanese Patent Application No. 2017-152031, filed on Aug. 4, 2017, the entire contents of which are incorporated herein by reference.

FIELD OF THE INVENTION

The present invention relates to a manufacturing method of a separator for a fuel cell.

BACKGROUND

There is known a fuel cell including a pair of separators sandwiching a membrane electrode gas diffusion layer assembly. Such a separator is formed with flow channels having a wavy shape in cross section. A reactant gas flows along the flow channels on the membrane electrode gas diffusion layer assembly side. A coolant flows on the side opposite to the flow channels. The membrane electrode gas diffusion layer assembly is sandwiched by the flow channels of the separators. In addition, there is known a separator including a metal plate and electro-conductive resin layers provided on respective surfaces of the metal plate. As for the flow channels, the metal plate and the electro-conductive resin layers are formed to have a wavy shape in cross section (see, for example, Japanese Unexamined Patent Application Publication No. 2003-297383).

The metal plate is formed to have a wavy shape in cross section by pressing. Therefore, a curvature of the metal plate might be partially increased, and the stiffness might be further decreased depending on the depth of the flow channel. In addition, if the depth of the flow channel is formed to be shallow in order to suppress such a decrease in stiffness of the metal plate, the pressure loss of the reactant gas and the coolant flowing along the flow channels may increase. Further, if a width of the flow channel is increased while ensuring the depth thereof in order to suppress the decrease in stiffness of the metal plate as described above, the membrane electrode gas diffusion layer assembly might not be sandwiched at a suitable interval. This might decrease an area of a membrane electrode assembly on which sufficient sandwiching force exerts, so that the membrane electrode assembly might repeatedly swell and expand in the area on which small sandwiching force exerts, and its strength might decrease.

SUMMARY OF THE INVENTION

It is therefore an object of the present invention to provide a manufacturing method of a separator for a fuel cell in which a decrease in stiffness of a metal plate is suppressed without influence on a width and a depth of a flow channel.

The above object is achieved by a manufacturing method of a separator for a fuel cell, including: preparing a first die including: a first convex surface and a first concave surface; and a first side surface connected between the first convex surface and the first concave surface; preparing a second die including: a second concave surface and a second convex surface respectively facing the first convex surface and the first concave surface; and a second side surface facing the first side surface and connected between the second concave surface and the second convex surface; preparing a metal plate having a flat plate shape, and two electro-conductive resin sheets; and forming a flow channel in the metal plate and the two electro-conductive resin sheets by hot pressing with the first and second dies in a state where one of the electro-conductive resin sheets is set at one side of the metal plate and the other one of the electro-conductive resin sheets is set at the other side of the metal plate, wherein the first convex surface includes a first portion provided between both end portions of the first convex surface in a direction in which the first convex surface and the first concave surface are arranged, protruding to the second concave surface, and having a protruding height higher than each height of the both end portions of the first convex surface.

In the hot pressing, the first portion of the first convex surface causes a part of the metal plate between the first convex surface and the second concave surface to be curved and to protrude to the second concave surface. Therefore, the part of the metal plate between the first convex surface and the second concave surface and a part of the metal plate between the first and second side surfaces are continuously curved. This suppresses a partial increase in curvature of the metal plate, and a decrease in stiffness of the metal plate.

The first portion may protrude from a part of the first convex surface to the second concave surface.

The first portion may be positioned at a center of the first convex surface in the direction in which the first convex surface and the first concave surface are arranged.

A plurality of the first portions may be provided on the first convex surface, and the first portions are arranged in the direction in which the first convex surface and the first concave surface are arranged.

The first portion may be curved such that the protruding height is higher than each height of the both end portions.

The first side surface may be curved continuously to the first portion.

A center of the first convex surface of the first portion in the direction in which the first convex surface and the first concave surface are arranged may protrude most to the second concave surface.

The second convex surface may include a second portion provided between both end portions of the second convex surface in a direction in which the second convex surface and the second concave surface are arranged, protruding to the first concave surface, and having a protruding height higher than each height of the both end portions of the second convex surface.

BRIEF DESCRIPTION OF THE DRAWINGS

FIGS. 4A to 4C are explanatory views of dies used in manufacturing the separator;

DETAILED DESCRIPTION

Figure 1:
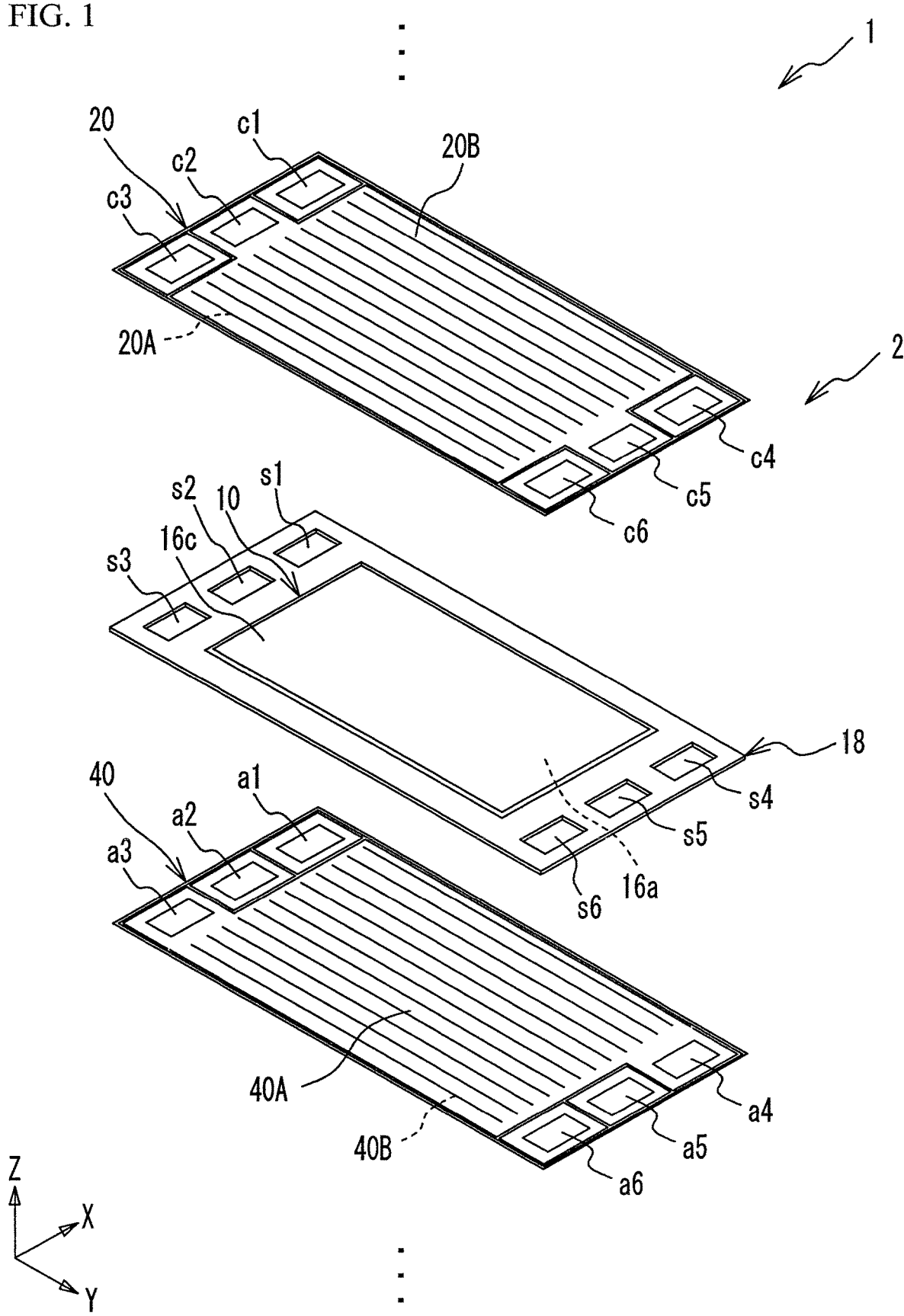
FIG. 1 is an exploded perspective view of a unit cell of a fuel cell.

FIG. 1 is an exploded perspective view of a unit cell 2 of a fuel cell 1. The fuel cell 1 is configured by stacking unit cells 2. FIG. 1 illustrates only one unit cell 2, and omits other unit cells. The unit cell 2 is stacked with other unit cells in the Z direction illustrated in FIG. 1. The unit cell 2 has a substantially rectangular shape. The longitudinal direction and the short direction of the unit cell 2 correspond to the Y direction and the X direction illustrated in FIG. 1, respectively.

The fuel cell 1 is a polymer electrolyte fuel cell that generates electric power with a fuel gas (for example, hydrogen) and an oxidant gas (for example, oxygen) as reactant gases. The unit cell 2 includes: a membrane electrode gas diffusion layer assembly 10 (hereinafter referred to as MEGA (Membrane Electrode Gas diffusion layer Assembly)); a support frame 18 supporting the MEGA 10; a cathode separator 20 and an anode separator 40 (hereinafter referred to as separators) sandwiching the MEGA 10. The MEGA 10 has a cathode gas diffusion layer 16c and an anode gas diffusion layer 16a (hereinafter referred to as diffusion layers). The support frame 18 has a substantially frame shape, and its inner peripheral side is joined to a peripheral region of the MEGA 10.

Holes c1 to c3 are formed along one of two short sides of the separator 20, and holes c4 to c6 are formed along the other side. Likewise, holes s1 to s3 are formed along one side of two short sides of the support frame 18, and holes s4 to s6 are formed along the other side. Likewise, holes a1 to a3 are formed along one side of two short sides of the separator 40, and holes a4 to a6 are formed along the other side. The holes c1, s1, and a1 communicate with one another to define a cathode inlet manifold. Likewise, the holes c2, s2, and a2 define a coolant inlet manifold. The holes c3, s3, and a3 define an anode outlet manifold. The holes c4, s4, and a4 define an anode inlet manifold. The holes c5, s5, and a5 define a coolant outlet manifold. The holes c6, s6, and a6 define a cathode outlet manifold. In the fuel cell 1 according to the present embodiment, liquid cooling water is used as a coolant.

A surface of the separator 40 facing the MEGA 10 is formed with anode flow channels 40A (hereinafter referred to as flow channels) which communicate the anode inlet manifold with the anode outlet manifold and along which the fuel gas flows. The surface of the separator 20 facing the MEGA 10 is formed with cathode flow channels 20A (hereinafter referred to as flow channels) which communicate the cathode inlet manifold with the cathode outlet manifold and along which the oxidant gas flows. The surface of the separator 40 opposite to the flow channels 40A and the surface of the separator 20 opposite to the flow channels 20A are respectively formed with coolant flow channels 20B and 40B (hereinafter referred to as flow channels) which communicate the coolant inlet manifold with the coolant outlet manifold and along which the coolant flows. The flow channels 20A and 20B extend in the longitudinal direction of the separator 20 (Y direction). Likewise, the flow channels 40A and 40B extend in the longitudinal direction of the separator 40 (Y direction).

Figure 2A:
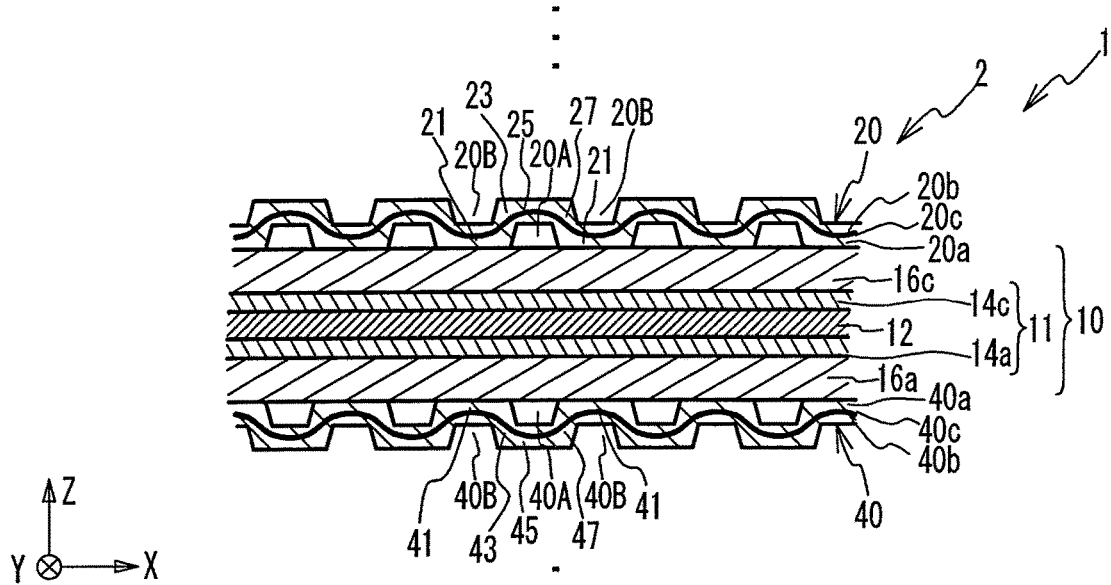
FIG. 2A is a partially cross-sectional view of the fuel cell where the unit cells are stacked.

FIG. 2A is a partially cross-sectional view of the fuel cell 1 where the unit cells 2 are stacked. FIG. 2A illustrates only one unit cell 2, and omits the other unit cells. FIG. 2A illustrates a cross section orthogonal to the Y direction.

The MEGA 10 includes the diffusion layers 16a and 16c, and a membrane electrode assembly (hereinafter referred to as MEA (Membrane Electrode Assembly)) 11. The MEA 11 includes an electrolyte membrane 12, and an anode catalyst layer 14a and a cathode catalyst layer 14c (hereinafter referred to as catalyst layers) formed on one surface and the other surface of the electrolyte membrane 12, respectively. The electrolyte membrane 12 is a solid polymer thin film, such as a fluorine-based ion exchange membrane, with high proton conductivity in a wet state. The catalyst layers 14a and 14c are made by coating a catalyst ink containing a carbon support carrying platinum (Pt) or the like and an ionomer having proton conductivity on the electrolyte membrane 12. The diffusion layers 16a and 16c are made of a material having gas permeability and conductivity, for example, a porous fiber base material such as carbon fiber or graphite fiber. The diffusion layers 16a and 16c are joined to the catalyst layers 14a and 14c, respectively.

The separator 20 includes: a metal plate 20c; an electro-conductive resin layer 20a (hereinafter, simply referred to as resin layer) formed on the diffusion layer 16c side of the metal plate 20c; and an electro-conductive resin layer 20b (hereinafter simply referred to as a resin layer) formed on the opposite side to the diffusion layer 16c of the metal plate 20c. A material of the metal plate 20c is not particularly limited, but can be stainless steel, titanium, aluminum, iron, copper, or the like. The resin layers 20a and 20b are made by dispersing conductive particles in a resin binder. The conductive particles can be appropriately selected from, for example, carbon, metal particles having conductivity such as stainless steel, titanium, and gold, and combination thereof. The resin binder can be appropriately selected from thermosetting resins such as epoxy and phenol, thermoplastic resins such as polypropylene, polyethylene, polyethylene naphthalate, and combination thereof. At least one of the resin layers 20a and 20b may further contain a hardening accelerator or a release agent such as fluorine. The metal plate 20c is covered with such resin layers 20a and 20b. This ensures the entire conductivity of the separator 20 and suppresses a decrease in corrosion resistance of the metal plate 20c. Also, the use of the metal plate 20c ensures airtightness between the oxidant gas flowing on one surface of the separator 20 and the coolant flowing on the other surface.

Likewise, the separator 40 includes: a metal plate 40c; an electro-conductive resin layer 40a (hereinafter, simply referred to as resin layer) formed on the diffusion layer 16a side of the metal plate 40c; and an electro-conductive resin layer 40b (hereinafter, simply referred to as a resin layer) formed on the opposite side to the diffusion layer 16a of the metal plate 40c. The separator 20 will be described below in detail. A detailed description of the separator 40 will be omitted, since the separator 40 is substantially the same as the separator 20.

The flow channels 20A, 20B, 40A, and 40B have a wavy shape in a cross-sectional view in the Y direction. Also, the resin layers 20a, 20b, 40a, and 40b and the metal plates 20c and 40c have a wavy shape in cross section. The flow channels 20A and 20B are defined by a convex portion 21, a side portion 23, a convex portion 25, a side portion 27, and a convex portion 21 . . . continuously repeated in the X direction, that is, in the direction in which the flow channels 20A and 20B are arranged. The convex portion 21 protrudes to the diffusion layer 16c so as to contact the diffusion layer 16c. The convex portion 25 does not contact the diffusion layer 16c and protrudes to the side opposite to the diffusion layer 16c. The side portion 23 is continuous and inclined between the convex portion 21 and the convex portion 25 away from the convex portion 21 in the +X direction. The side portion 27 is continuous and inclined between the convex portion 25 and the convex portion 21 away from the convex portion 25 in the +X direction.

A space surrounded by the side portion 23, the convex portion 25, and the side portion 27 is defined as the flow channel 20A of the separator 20 on the diffusion layer 16c side. Further, the convex portion 25 contact an anode separator of another unit cell not illustrated adjacent to the upper side of the unit cell 2 illustrated in FIG. 2A. On the anode separator side not illustrated, a space surrounded by the convex portion 21 and the side portions 23 and 27 is defined as the flow channel 20B of the separator 20. In this way, the flow channels 20A and 20B are integrally formed respectively on the side and the other side of the separator 20. The flow channels 20A and 20B are an example of flow channels formed by pressing the metal plate 20c and the resin layers 20a and 20b.

Likewise, the flow channels 40A and 40B are defined by a convex portion 41, a side portion 43, a convex portion 45, a side portion 47, and a convex portion 41 . . . continuously repeated in the X direction. The convex portion 41 protrudes to the diffusion layer 16a so as to contact the diffusion layer 16a. The convex portion 45 does not contact the diffusion layer 16a and protrudes to the side opposite to the diffusion layer 16a. The side portion 43 is continuous and inclined between the convex portion 41 and the convex portion 45 away from the convex portion 41 in the +X direction. The side portion 47 is continuous and inclined between the convex portion 45 and the convex portion 41 away from the convex portion 45 in the +X direction.

A space surrounded by the side portion 43, the convex portion 45, and the side portion 47 is defined as the flow channel 40A of the separator 40 on the diffusion layer 16a side. Further, the convex portion 45 contact a cathode separator of another unit cell not illustrated adjacent to the lower side of the unit cell 2 illustrated in FIG. 2. On the cathode separator side not illustrated, a space surrounded by the convex portion 41 and the side portions 43 and 47 is defined as the flow channel 40B of the separator 40. In this way, the flow channels 40A and 40B are integrally formed respectively on the side and the other side of the separator 40.

Figure 2B:
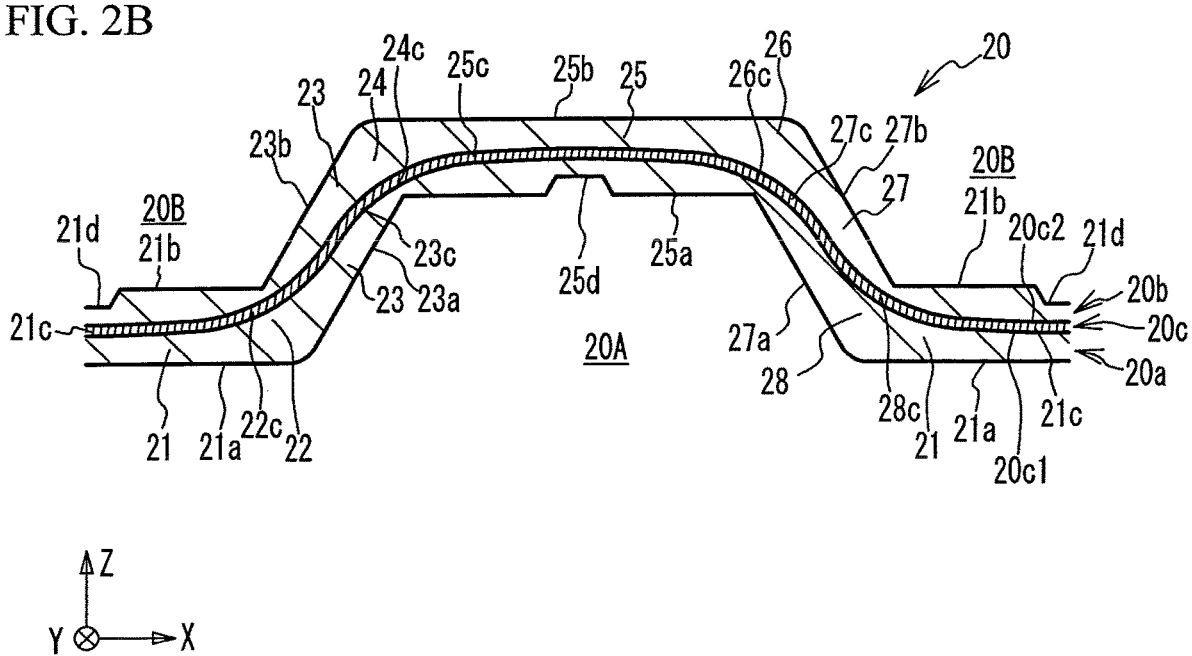
FIG. 2B is a partially enlarged sectional view of a separator.

FIG. 2B is a partially enlarged view of the separator 20. The metal plate 20c includes a surface 20c1 and a surface 20c2 opposite thereto. The surfaces 20c1 and 20c2 are respectively coated with the resin layers 20a and 20b. Additionally, the separator 20 includes curved portions 22, 24, 26, and 28 without reference numerals in FIG. 2A. The curved portion 22 is curved between the convex portion 21 and the side portion 23. Likewise, the curved portion 24 is curved between the side portion 23 and the convex portion 25. The curved portion 26 is curved between the convex portion 25 and the side portion 27. The curved portion 28 is curved between the side portion 27 and the convex portion 21. The entire thickness of the separator 20 is substantially uniform at any position. The convex portions 21 and 25 are substantially parallel to the X direction and each has a substantially linear shape. The side portion 23 is inclined between the +X direction and the +Z direction from the convex portion 21 in the +X direction and has a substantially linear shape. The side portion 27 is inclined between the +X direction and the −Z direction from the convex portion 25 in the +X direction and has a substantially linear shape.

Herein, the convex portion 21 includes a convex surface 21a and a concave surface 21b. The convex portion 21a is the outer surface of the resin layer 20a, and the concave surface 21b is the outer surface of the resin layer 20b. The side portion 23 includes side surfaces 23a and 23b. The side surface 23a is the outer surface of the resin layer 20a, and the side surface 23b is the outer surface of the resin layer 20b. The convex portion 25 includes a concave surface 25a and a convex surface 25b. The concave surface 25a is the outer surface of the resin layer 20a, and the convex surface 25b is the outer surface of the resin layer 20b. The side portion 27 includes side surfaces 27a and 27b. The side surface 27a is the outer surface of the resin layer 20a, and the side surface 27b is the outer surface of the resin layer 20b. The convex portion 21 also includes a convex portion 21c, which is a region of the metal plate 20c. The curved portion 22 includes a curved region 22c, which is a region of the metal plate 20c. The side portion 23 also includes a side region 23c, which is a region of the metal plate 20c. The curved portion 24 includes a curved region 24c, which is a region of the metal plate 20c. The convex portion 25 also includes a convex region 25c, which is a region of the metal plate 20c. The curved portion 26 includes a curved region 26c, which is a region of the metal plate 20c. The side portion 27 also includes a side region 27c, which is a region of the metal plate 20c. The curved portion 28 includes a curved region 28c, which is a region of the metal plate 20c.

The convex surfaces 21a and 25b and the concave surfaces 21b and 25a are substantially parallel to the X direction. The side surfaces 23a and 23b are substantially parallel to each other. The side surfaces 27a and 27b are substantially parallel to each other. The side surfaces 23a and 23b and the side surfaces 27a and 27b are substantially symmetrical with respect to a plane that is perpendicular to the X axis and passes through the convex portion 25. The convex surfaces 21a and 25b and the concave surfaces 21b and 25a are flat. However, the convex region 21c positioned between the convex surface 21a and the concave surface 21b is curved so as to slightly protrude in the −Z direction, in other words, to the surface 20c1. On the other hand, the convex region 25c positioned between the concave surface 25a and the convex surface 25b is curved so as to slightly protrude in the +Z direction, in other words, to the surface 20c2. The side surfaces 23a, 23b, 27a, and 27b are also flat, but not limited thereto.

Figure 6:
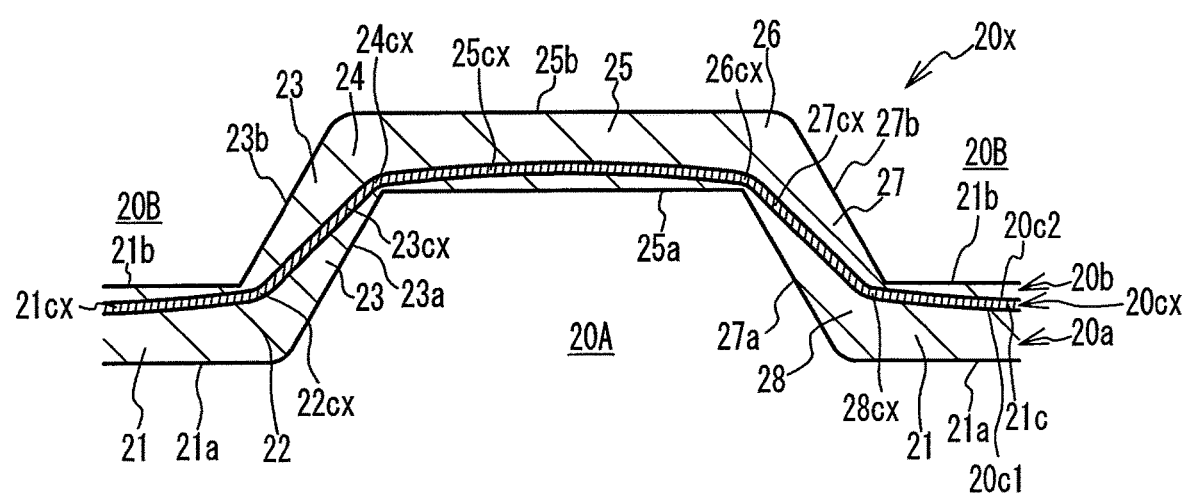
FIG. 6 is a partially enlarged sectional view of a separator of a comparative example.
Figure 6:
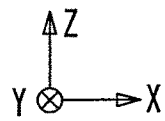

A recess portion 25d is formed substantially at the center of the concave surface 25a in the X direction. Likewise, a recess portion 21d is formed substantially in the center of the concave surface 21b in the X direction. The convex region 25c is curved so as to slightly protrude to the convex surface 25b and away from the recess portion 25d. The convex region 21c is also curved so as to slightly protrude to the convex surface 21a and away from the recess portion 21d. Herein, it is assumed that the recess portions 21d and 25d are not formed, the convex region 21c is close to the concave surface 21b, and the convex region 25c is close to the concave surface 25a as compared with the case illustrated in FIG. 2B. As will be described in detail later, as illustrated in FIG. 6, the curved regions 22c, 24c, 26c, and 28c and the like are greatly curved and each curvature thereof is increased as compared with the case illustrated in FIG. 2B. In contrast, in this embodiment, the convex regions 21c and 25c are curved so as to slightly protrude to the convex surfaces 21a and 25b, respectively. This suppresses an increase in each curvature in the curved regions 22c, 24c, 26c, and 28c.

As will be described in detail later, the separator 20 is formed by hot pressing described above, and a flat metal plate is compressed with dies and deformed in the hot pressing, so that the metal plate 20c illustrated in FIG. 2B is also formed. Therefore, a partial increase in curvature illustrated in FIG. 6 might reduce the stiffness of a part of the metal plate 20c. However, a partial increase in curvature is suppressed in the present embodiment, thereby suppressing a decrease in stiffness of the metal plate 20c.

Moreover, this eliminates the necessity of making the flow channels 20A and 20B shallow in order to suppress an increase in each curvature of the curved regions 22c, 24c, 26c, and 28c. This suppresses an increase in pressure loss of the oxidant gas and the coolant respectively flowing along the flow channels 20A and 20B. This also suppresses a decrease in power generation efficiency of the fuel cell 1 and suppresses a decrease in cooling efficiency. Further, this eliminates the necessity of widening the flow channels 20A and 20B while securing the depths thereof in order to suppress an increase in each curvature of the curved regions 22c, 24c, 26c, and 28c. It is therefore possible to sandwich the MEGA 10 at a suitable interval. This also suppresses a decrease in strength of the MEA 11 due to repetition of swell, expansion, and contraction thereof. Additionally, the recess portions 21d and 25d are shallow, so that the pressure losses of the oxidant gas and the coolant respectively flowing along the flow channels 20A and 20B do not increase.

The convex surface 25b is flat as described above, thereby ensuring the contact area between the convex surface 25b of the separator 20 and the separator of the other unit cell adjacent to the separator 20. This suppresses an increase in electric resistance between the separator 20 and the separator of the other adjacent unit cell.

Likewise, the convex surface 21a is flat. This can ensure the contact area between the convex surface 21a of the separator 20 and the diffusion layer 16c. It is therefore possible to stably hold the MEGA 10 between the separators 20 and 40. This can hold the MEA 11 with sufficient sandwiching force. It is thus possible to suppress a decrease in strength of the MEA 11 due to repetition of swell, expansion, and contraction in a region thereof on which insufficient sandwiching force exerts.

The ratio of the thickness of the metal plate 20c to the total thickness of the resin layers 20a and 20b and the metal plate 20c is preferably set to 50% or less. As the thickness of the metal plate 20c is smaller relative to the total thickness of the resin layers 20a and 20b and the metal plate 20c, an increase in each curvature of, for example, the curved region 22c and the curved region 24c can be further suppressed.

Figure 3:
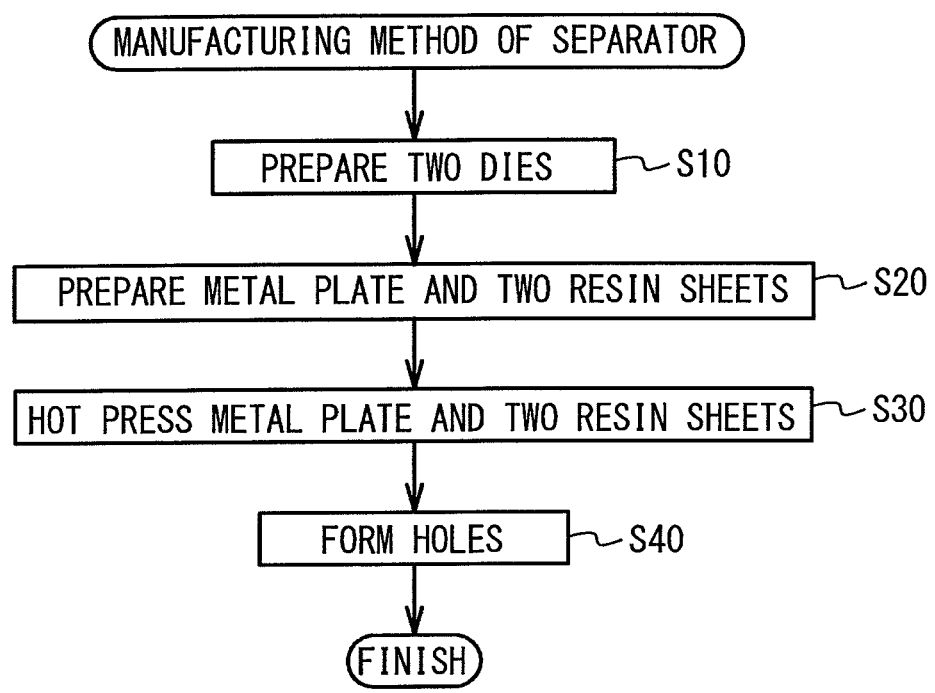
FIG. 3 is a flowchart illustrating a manufacturing method of a separator.
Figure 5A:
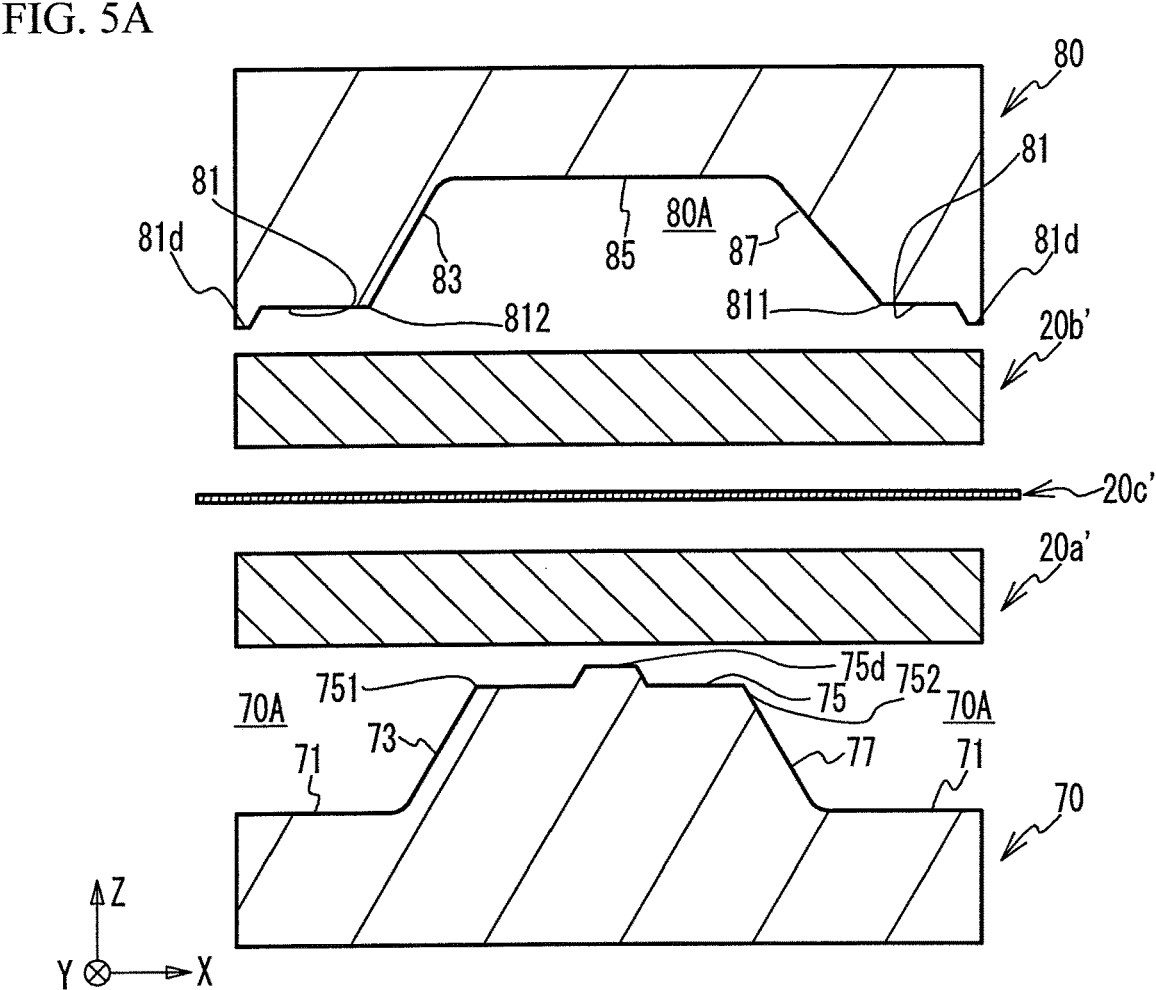
FIGS. 5A and 5B are explanatory views of the separator.
Figure 5B:
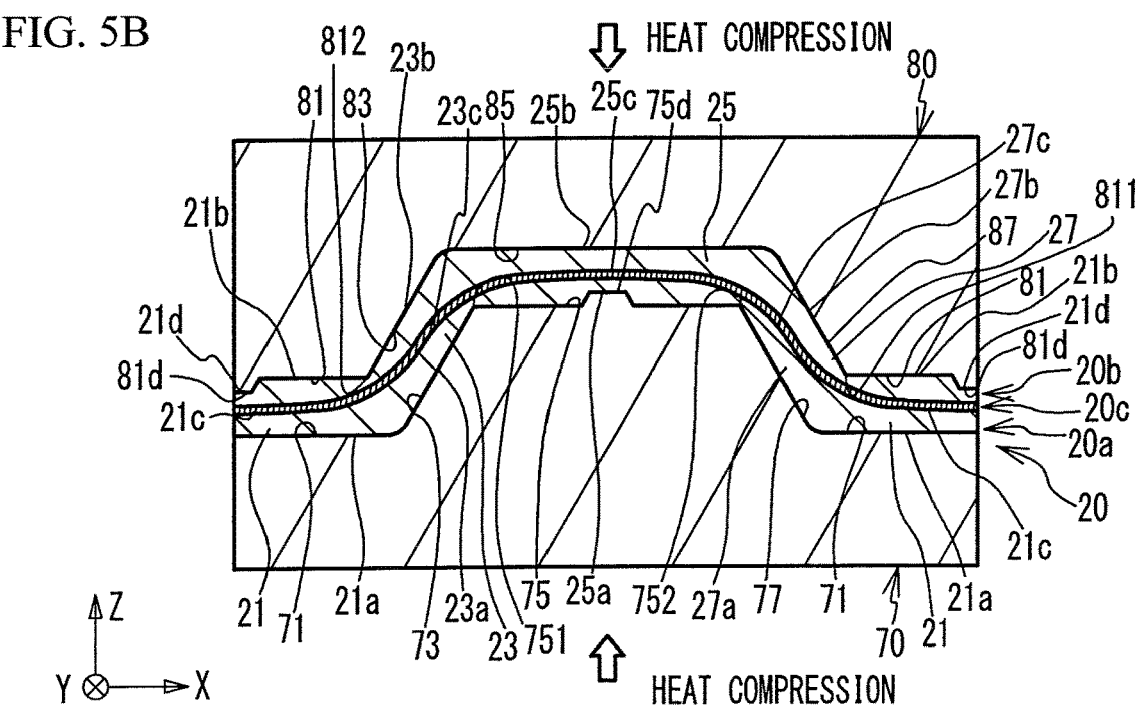

Next, a method of manufacturing the separator 20 will be described. FIG. 3 is a flowchart illustrating the method of manufacturing the separator 20. FIGS. 4A to 4C are explanatory views of dies 70 and 80 used in manufacturing the separator 20. FIG. 4A illustrates external views of the dies 70 and 80, and FIGS. 4B and 4C are partially enlarged views of the dies 80 and 70, respectively. FIGS. 5A and 5B are explanatory views of the method of manufacturing the separator 20. As described above, the separator 20 is manufactured by hot pressing. FIGS. 4B, 5A, and 5B illustrate partially enlarged views of the dies in cross section. First, the dies 70 and 80 are prepared (step S10).

As illustrated in FIG. 4A, grooves 70A extending in the Y direction and having a wavy shape in the X direction are formed on the surface of the die 70 opposite to the die 80. Likewise, grooves 80A extending in the Y direction and having a wavy shape in the X direction are formed on the surface of the die 80 opposite to the die 70. Recessed portions 70c1 to 70c3 and recessed portions 70c4 to 70c6 are formed on the surface of the die 70 opposite to the die 80 so as to sandwich the grooves 70A in the Y direction. Recessed portions 80c1 to 80c3 and recessed portions 80c4 to 80c6 are formed on the surface of the die 80 opposite to the die 70 so as to sandwich the grooves 80A in the Y direction. The grooves 70A and 80A are portions for forming the flow channels 20A and 20B of the separator 20. The recessed portions 70c1 to 70c6 are respectively opposite to the recessed portions 80c1 to 80c6, and they are portions for forming the holes c1 to c6.

As illustrated in FIG. 4B, the groove 80A is defined by a convex surface 81, a side surface 83, a concave surface 85, a side surface 87, a convex surface 81 . . . formed in this order in the X direction. The concave surface 85 recedes from the die 70 with respect to the convex surface 81, and the convex surface 81 protrudes to the die 70 from the concave surface 85. A part of the convex surface 81 and the concave surface 85 are substantially parallel to the X direction and are formed into be flat. The side surface 83 is inclined and positioned between the convex surface 81 and the concave face 85 positioned in the +X direction from the convex surface 81, and connects the both surfaces. The side surface 87 is inclined and positioned between the concave surface 85 and the convex surface 81 positioned in the +X direction from the concave surface 85, and connects both surfaces. On the convex surface 81, a protruding portion 81d partially protruding from the convex surface 81 to the die 70 is formed to extend in the Y direction, that is, the direction in which the groove 80A extends. The protruding portion 81d is formed on the entire convex surface 81. The convex surface 81 has an end portion 811 and an end portion 812 positioned in the +X direction from the end portion 811. The end portion 811 is a boundary portion between the side surface 87 and the convex surface 81, and the end portion 812 is a boundary portion between the convex surface 81 and the side surface 83.

The protruding portion 81d is not particularly limited, but is provided at substantially the center in the X direction of the convex surface 81. The protruding height of the protruding portion 81d from the convex surface 81 is not particularly limited, but is constant in the Y direction. The protruding portion 81d has a taper shape such that a top surface is flat and both side surfaces are inclined and closer to each other as being farther away from the convex surface 81 in the −Z direction in a cross-sectional view perpendicular to the Y direction. However, the shape of the protruding portion 81d is not particularly limited to this. As illustrated in FIG. 5A which will be described later, the protruding height of the protruding portion 81d from the convex surface 81 is the same as the depth of the recess portion 21d illustrated in FIG. 2B.

As illustrated in FIG. 4C, the groove 70A is defined by a concave surface 71, a side surface 73, a convex surface 75, a side surface 77, a concave surface 71 . . . formed in this order in the X direction. The convex surface 75 protrudes to the die 80 with respect to the concave surface 71, and the concave surface 71 recedes from the die 80 with respect to the convex surface 75. The concave surface 71 and a part of the convex surface 75 are substantially parallel to the X direction and are flat. The side surface 73 is inclined between the concave surface 71 and the convex surface 75 positioned in the +X direction from the concave surface 71, and connects both surfaces. The side surface 77 is positioned between the convex surface 75 and the concave surface 71 positioned in the +X direction from the convex surface 75, and connects both surfaces. On the convex surface 75, a protruding portion 75d partially protruding from the convex surface 75 to the die 80 is formed to extend in the Y direction, that is, the direction in which the groove 70A extends. The protruding portion 75d is formed over the entire convex surface 75. The convex surface 75 includes an end portion 751 and an end portion 752 positioned in the +X direction from the end portion 751. The end portion 751 is a boundary portion between the side surface 73 and the convex surface 75, and the end portion 752 is a boundary portion between the convex surface 75 and the side surface 77.

The protruding portion 75d is not particularly limited, but is provided at substantially the center in the X direction of the convex surface 75. The protruding height of the protruding portion 75d from the convex surface 75 is not particularly limited, but is constant in the Y direction. The protruding portion 75d has a taper shape such that a top surface is flat and both side surfaces are inclined and closer to each other as being farther away from the convex surface 75 in the +Z direction in a cross-sectional view perpendicular to the Y direction. However, the shape of the protruding portion 75d is not particularly limited to this. As illustrated in FIG. 5A which will be described later, the protruding height of the protruding portion 75d is the same as the protruding height of the protruding portion 81d and as the depth of the recess portion 25d illustrated in FIG. 2B.

The concave surface 71, the side surface 73, the convex surface 75, and the side surface 77 are respectively complementary to the convex surface 81, the side surface 83, the concave surface 85, and the side surface 87. The dies 70 and 80 are set beforehand such that the concave surface 71, the side surface 73, the convex surface 75, and the side surface 77 respectively face the convex surface 81, the side surface 83, the concave surface 85, and the side surface 87. Thus, the protruding portion 75d of the die 70 partially protrudes from the convex surface 75 to the concave surface 85 of the die 80, and the protruding portion 81d of the die 80 partially protrudes from the convex surface 81 to the concave surface 71 of the die 70. That is, the convex surface 75 includes the protruding portion 75d as an example of a portion provided between the end portions 751 and 752 of the convex surface 75 in the direction in which the convex surface 75 and the concave surface 71 are arranged, protruding to the concave surface 85, and having a protruding height higher than each height of the end portions 751 and 752. Further, the convex surface 81 includes the protruding portion 81d as an example of a portion provided between the end portions 811 and 812 of the convex surface 81 in the direction in which the convex surface 81 and the concave surface 85 are arranged, protruding to the concave surface 71, and having a protruding height higher than each height of the end portions 811 and 812. Additionally, in the separator 20, a round corner portion is provided at any one of a position between the side surface 23a and the concave surface 25a, a position between the concave surface 25a and the side surface 27a, a position between the concave surface 21b and the side surface 23b, and a position between the concave surface 21b and the side surface 27b, and the round corner portion is for smoothly connecting these surfaces. When the round corner portion is provided, each of the dies 70 and 80 is provided with a round corner portion having a curved surface at a corresponding position thereof. For example, when a round corner portion is provided between the side surface 73 and the convex surface 75, the round corner portion is not included in the convex surface 75 but in the side surface 73. Therefore, the end portion 751 of the convex surface 75 is not included in the round corner portion, but corresponds to the boundary portion between the flat convex surface 75 and the curved round corner portion. The same applies to the case where the round corner portion is provided between the convex surface 75 and the side surface 77, between the side surface 87 and the convex surface 81, or between the side surface 83 and the convex surface 81. That is, the end portions 752, 811, and 812 are not included in the round corner portion.

Each angle of the above-described surfaces is set to correspond to each outer surface of the above-described separator 20 as follows. Specifically, each of an exterior angle of the die 70 between the concave surface 71 and the side surface 73, an exterior angle of the die 70 between the side surface 77 and the concave surface 71, an exterior angle of the die 80 between the side surface 83 and the concave surface 85, and an exterior angle of the die 80 between the concave surface 85 and the side surface 87 are set to be 90 degrees or more but less than 180 degrees. Each of an exterior angle of the die 70 between the side surface 73 and the convex surface 75, an exterior angle of the die 70 between the convex surface 75 and the side surface 77, exterior angle of the die 80 between the convex surface 81 and the side surface 83, an exterior angle of the die 80 between the side face 87 and the convex face 81 is set to be greater than 180 degrees but not more than 270 degrees.

Next, a metal plate 20c' and resin sheets 20a' and 20b' are prepared (step S20). The metal plate 20c' corresponds to the metal plate 20c of the completed separator 20. The resin sheets 20a' and 20b' respectively correspond to the resin layers 20a and 20b of the completed separator 20. As an example, when a thermosetting resin is used as the resin binder, the resin sheets 20a' and 20b' are heated to a temperature lower than the curing temperature of the thermosetting resin to be brought into a semi-cured state and to each have a sheet shape. Next, the resin sheets 20a' and 20b' and the metal plate 20c' are heated and pressed by the dies 70 and 80, in a state where the resin sheet 20a' is set closer to the die 70 in one side of the metal plate 20c' and the resin sheet 20b' is set close to the die 80 in the other side of the metal plate 20c' as illustrated in FIGS. 5A and 5B (step S30). In addition, reference numerals are omitted in FIG. 5B.

When the hot pressing starts in the state where the resin sheets 20a' and 20b' and the metal plate 20c' are laminated, the convex surface 75 presses the resin sheet 20a' to the die 80, and the convex surface 81 presses the resin sheet 20b' to the die 70. Then, the resin sheets 20a' and 20b' and the metal plate 20c' are integrally curved along the shapes of the dies 70 and 80. Herein, the resin sheets 20a' and 20b' in the semi-cured state described above are softer than the metal plate 20c'. Thus, the resin sheets 20a' and 20b' are respectively deformed along the shapes of the dies 70 and 80, and the deformation amount of the metal plate 20c' is smaller than that of the resin sheets 20a' and 20b'. In addition, with the protruding portion 75d, the metal plate 20c' is curved to protrude to the concave surface 85. Likewise, with the protruding portion 81d, the metal plate 20c' is curved to protrude to the concave surface 71. As a result, like the metal plate 20c illustrated in FIG. 2B, the convex region 21c, the side region 23c, the convex region 25c, and the side region 27c are continuously curved, and the curvature is suppressed from partially increasing. Further, the resin sheets 20a' and 20b' are deformed and compressed to form the resin layers 20a and 20b illustrated in FIG. 5B. Therefore, the separator 20 having the metal plate 20c with the curvature suppressed from partially increasing is manufactured. In addition, when the dies 70 and 80 are closest to each other, the distance between the convex surface 75 and the concave surface 85 in the Z direction is adjusted so as to be each thickness of the convex portions 21 and 25 illustrated in FIG. 2.

In consideration of the viscosity of the resin sheets 20a' and 20b' in the hot pressing, the heating temperature of the resin sheets 20a' and 20b' is adjusted so as to each have a desired shape before the resin sheets 20a' and 20b' are completely thermally cured. In the hot pressing, the resin sheet 20a' is compressed between the die 70 and the metal plate 20c. Additionally, after the hot pressing, the resin layers 20a and 20b and the metal plate 20c are cooled and integrated. Further, the deformation amount of the metal plate 20c' can be adjusted by changing each viscosity of the resin sheets 20a' and 20b'. The relatively low viscosity of the resin sheets 20a' and 20b' causes a small deformation amount of the metal plate 20c'. The relatively high viscosity of the resin sheets 20a' and 20b' causes a large deformation amount of the metal plate 20c'.

After the flow channels 20A and 20B are formed, holes are formed at positions corresponding to the recessed portions 70c1 to 70c6 and 80c1 to 80c6 of the integrated resin layers 20a and 20b and the metal plate 20c so as to form the holes c1 to c6 illustrated in FIG. 1 (Step S40). In such a manner, the separator 20 is manufactured. The separator 40 is also manufactured by the same method.

The flow channels 20A and 20B can be formed by hot pressing the resin sheets 20a' and 20b' and the flat plate-shaped metal plate 20c' once. Thus, the manufacturing method is simplified. In order to improve the joining force between the resin sheets 20a' and 20b' and the metal plate 20c', undercoat paint may be applied beforehand on both surfaces of the metal plate 20c' before the hot pressing. This can ensure the stiffness of the completed separator 20. In addition, the surface portions of the resin sheets 20a' and 20b' may be previously joined to the metal plate 20c' before the hot pressing. This facilitates handling the metal plate 20c' and the resin sheets 20a' and 20b' in the hot pressing.

The concave surfaces 71 and 85 are flat, so that the convex surfaces 21a and 25b of the separator 20 are also flat. This can ensure the contact area between the separator 20 and the separator of another unit cell adjacent to the separator 20, and ensure the contact area between the separator 20 and the diffusion layer 16c, as described above.

Next, a separator 20x of a comparative example will be described. FIG. 6 is a partially enlarged sectional view of the separator 20x of the comparative example. The separator 20x is manufactured by the same manufacturing method as the separator 20 according to the present embodiment, but it is manufactured by two dies not provided with the protruding portions 75d and 81d. Therefore, unlike the separator 20, the separator 20x is not formed with the recess portions 21d and 25d. A metal plate 20cx of the separator 20x includes a convex region 21cx, a curved region 22cx, a side region 23cx, a curved region 24cx, a convex region 25cx, a curved region 26cx, a side region 27cx, and a curved region 28cx, but differs from the metal plate 20c of the separator 20 in shape. Specifically, as compared with the separator 20 in the present embodiment illustrated in FIG. 2B, the convex region 21cx is positioned close to the concave surface 21b, and the convex region 25cx is positioned close to the concave surface 25a. This is because two dies without the protruding portions 75d and 81d are used as described above. Therefore, as compared with the metal plate 20c in the present embodiment, the curvatures at the curved regions 22cx, 24cx, 26cx, and 28cx increases. As for the separator 20x manufactured by the two dies not provided with the protruding portions 75d and 81d, the curvature of the metal plate 20cx partially increases. Since the dies 70 and 80 respectively provided with the protruding portions 75d and 81d are used in the present embodiment, the convex region 21c and the convex region 25c of the metal plate 20c are respectively suppressed from being too close to the concave surfaces 21b and 25a. Thus, the convex regions 21c and 25c are suitably curved to suppress the curvature of the metal plate 20c from partially increasing.

In the above embodiment, the protruding portions 75d and 81d are respectively formed in the dies 70 and 80, but such a protruding portion may be formed only in one thereof. For example, even when the protruding portion 75d is provided in the die 70 and the protruding portion 81d is not provided in the die 80, the convex region 25c of the metal plate 20c is curved to protrude to the die 80 by the protruding portion 75d, thereby suppressing an increase in each curvature of the curved regions 24c and 26c adjacent to the convex region 25c. Further, the position of the protruding portion 75d is not limited to the center of the convex surface 75 in the X direction. The size of the protruding portion 75d is not limited to the above one, and may be appropriately set in light of a limit value of curvature of the metal plate 20c and the like. The shape of the protruding portion 75d is not limited to the above one, and for example, the top surface thereof may protrude to the concave surface 85 in a curved shape, and at least one of both side surfaces of the protruding portion 75d may be perpendicular to the convex surface 75. Similarly, the position, the size, and the shape of the protruding portion 81d are not limited to the above examples. Further, it is not necessary that the protruding portion 75d is formed on each of the convex surfaces 75 of the die 70, and the protruding portion 75d may be formed on at least one of the convex surfaces 75. The same applies to the protruding portion 81d provided in the die 80.

The above manufacturing method have described the thermosetting resin as an example of the resin binders of the resin sheets 20a' and 20b'. In the case of the thermoplastic resin as the resin binder, the resin sheet is heated to a certain temperature to be brought into a semi-cured state before the hot press, and the resin sheet is pressed and heated to a temperature at which the viscosity does not decrease too much, and then the resin sheet may be cooled. In steps S10 and S20, the order of preparing the die 70, the die 80, the metal plate 20c', the resin sheet 20a', and the resin sheet 20b' is not limited.

Figure 7A:
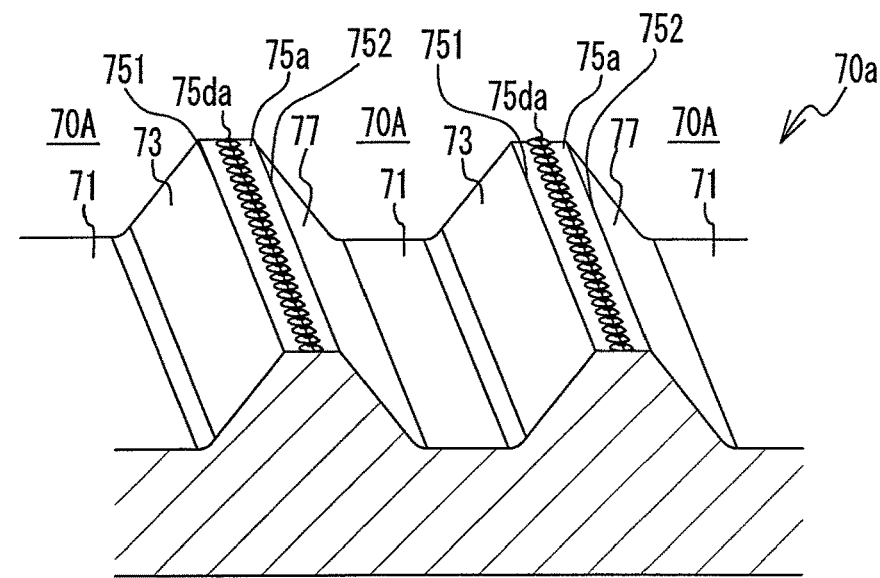
FIG. 7A is a partially cross-sectional perspective view of a die according to the first variation.

Next, variations of the die will be described. Additionally, the same components are represented by the same reference numerals, and duplicated explanation is omitted. FIG. 7A is a partially cross-sectional perspective view of a die 70a according to the first variation. A protruding portion 75da as an example of the above-described portion is formed on a convex surface 75a of the die 70a. Specifically, the protruding portion 75da is formed into a conical shape on the convex surface 75a. The protruding portions 75da are provided in a direction in which the groove 70A extends, and the protruding height of the entire protruding portions 75da from the convex surface 75a is not constant in the Y direction. Such dies 70a and 80 can suppress the curvature of the metal plate 20c from partially increasing. Instead of the die 80, a die provided with the protruding portions 75da may be used, like the die 70a.

The shape of the protruding portion 75da is not limited to a conical one, and may be, for example, a pyramidal shape, a columnar shape, or a prismatic shape. The protruding portions 75da may be provided so as to contact with each other in the Y direction, or may be provided at predetermined intervals. In the case where the protruding portions are provided at predetermined intervals in the Y direction, the protruding portion are preferably provided at certain intervals such that the shape of the convex region 25c of the metal plate 20c is constant regardless of the position in the Y direction in the hot press. The number and the size of the protruding portions 75da are not particularly limited.

Figure 7B:
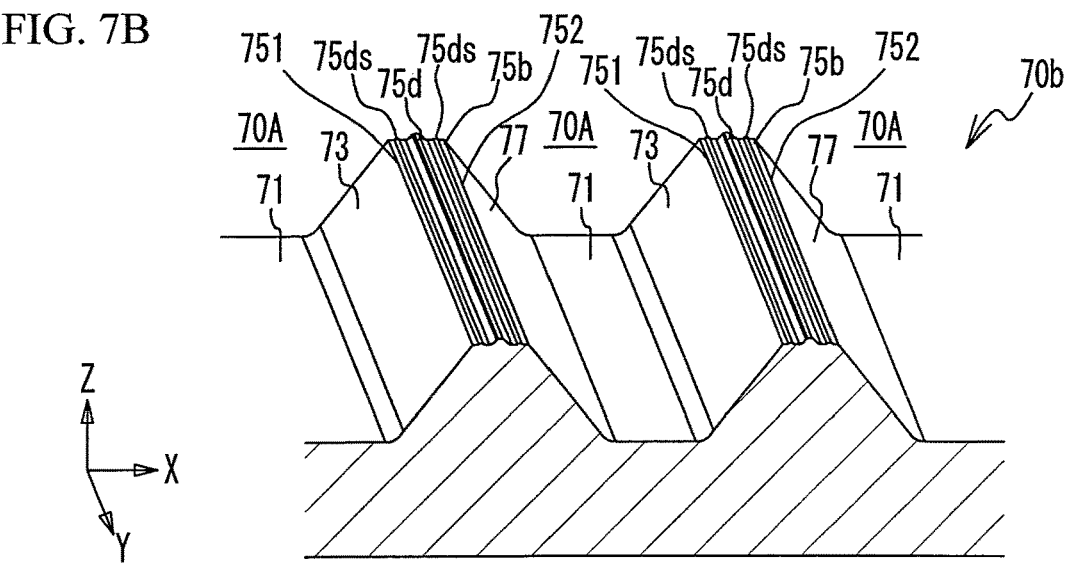
FIG. 7B is a partially cross-sectional perspective view of a die according to a second variation.
Figure 7C:
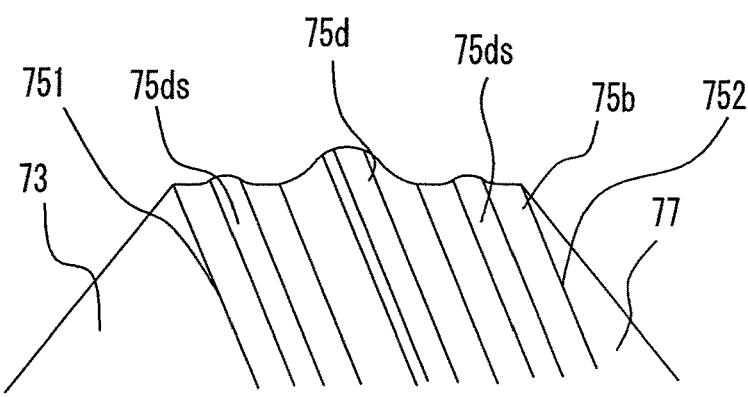
FIG. 7C is a partially enlarged view of FIG. 7B.

FIG. 7B is a partially cross-sectional perspective view of a die 70b according to the second variation. FIG. 7C is a partially enlarged view of FIG. 7B. On a convex surface 75b of the die 70b, in addition to the protruding portion 75d, protruding portions 75ds are formed as an example of the above-described portion. Specifically, the two protruding portions 75ds are provided so as to extend substantially parallel to the protruding portion 75d and to sandwich the protruding portion 75d. That is, the protruding portions 75d and 75ds provided on the single convex surface 75b are arranged in such a direction that the concave surface 71 and the convex surface 75b are arranged. The protruding height of the protruding portion 75ds from the convex surface 75b is lower than that of the protruding portion 75d. The interval between one of the two protruding portions 75ds and the protruding portion 75d in the X direction is set to be the same as the interval between the other of the two protruding portions 75ds and the protruding portion 75d in the X direction. In addition to the protruding portion 75d, the protruding portion 75ds can finely process the height position in the Z direction around the curved regions 24c and 26c in the convex region 25c of the metal plate 20c, thereby forming the metal plate 20c' in a desired shape and suppressing the curvature of the metal plate 20c from partially increasing. Such dies 70b and 80 can suppress the curvature of the metal plate 20c from partially increasing. Instead of the die 80, a die provided with the protruding portions 75d and 75ds may be used like the die 70b, or a die provided with the protruding portions 75da may be used like the die 70a.

The protruding portion 75ds may be substantially the same as the protruding portion 75d in protruding height from the convex surface 75b, or may be higher than the protruding portion 75d. In the above variation, a total of three protruding portions including the protruding portion 75d and the two protruding portions 75ds are provided on the single convex surface 75b, but the number of the protruding portions is not limited. The position of the protruding portion 75ds is not limited to the above. Further, the interval between the protruding portions in the X direction may not be even.

Figure 8:
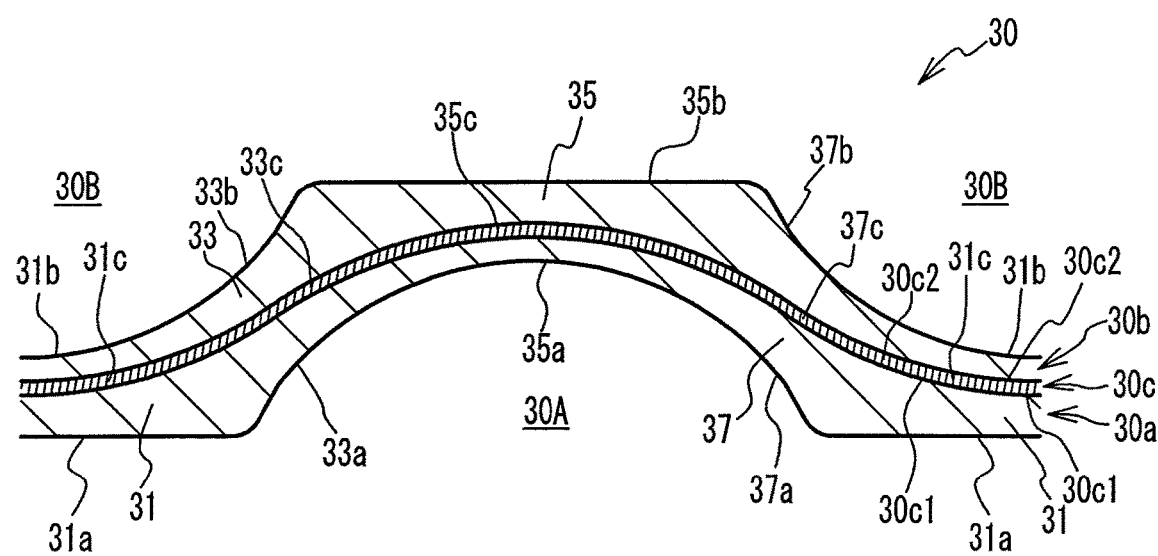
FIG. 8 is a partially enlarged sectional view of a separator manufactured by dies according to the third variation.
Figure 8:
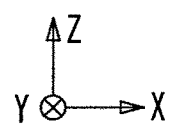

A separator 30 manufactured by dies 70c and 80c according to the third variation will be described before describing the dies 70c and 80c. FIG. 8 is a partially enlarged sectional view of the separator 30 manufactured by the dies 70c and 80c according to the third variation. A metal plate 30c has a surface 30c1 and a surface 30c2 opposite to the surface 30c1. The surfaces 30c1 and 30c2 are respectively covered with resin layers 30a and 30b. The materials of the resin layers 30a and 30b are the same as those of the resin layers 20a and 20b described above. Flow channels 30A and 30B extend in the Y direction. The flow channels 30A and 30B are defined by a convex portion 31, a side portion 33, a convex portion 35, a side portion 37, a convex portion 31, . . . that are repeated continuously in the X direction, that is, the direction in which the flow channels 30A and 30B are arranged. In the case where the separator 30 is used instead of the separator 20 illustrated in FIG. 2A, the convex portion 31 contacts the diffusion layer 16c, and the convex portion 35 contacts a separator of the adjacent other unit cell. The side portion 33 is inclined and continuous between the convex portion 31 and the convex portion 35 positioned in the +X direction from the convex portion 31. The side portion 37 is inclined and continuous between the convex portion 35 and the convex portion 31 positioned in the +X direction from the convex portion 35.

Here, the convex portion 31 includes a convex surface 31a and a concave surface 31b. The convex portion 31a is the outer surface of the resin layer 30a, and the concave surface 31b is the outer surface of the resin layer 30b. The side portion 33 includes side surfaces 33a and 33b. The side surface 33a is the outer surface of the resin layer 30a, and the side surface 33b is the outer surface of the resin layer 30b. The convex portion 35 includes a concave surface 35a and a convex surface 35b. The concave surface 35a is the outer surface of the resin layer 30a, and the convex surface 35b is the outer surface of the resin layer 30b. The side portion 37 includes side surfaces 37a and 37b. The side surface 37a is the outer surface of the resin layer 30a, and the side surface 37b is the outer surface of the resin layer 30b. The convex portion 31 also includes a convex portion 31c, which is a region of the metal plate 20c. The side portion 33 also includes a side region 33c, which is a region of the metal plate 20c. The convex portion 35 also includes a convex region 35c, which is a region of the metal plate 20c. The side portion 37 also includes a side region 37c, which is a region of the metal plate 20c.

The convex surfaces 31a and 35b are substantially parallel to the X direction and are flat. The concave surface 35a is curved such that the flow channel 30A is made deeper as being closer to the center in the X direction within the range of the convex portion 35. That is, the thickness of the convex portion 35 corresponding to the distance between the concave surface 35a and the convex surface 35b in the Z direction is made gradually thicker as being farther away from the center of the convex portion 35 in the X direction. Likewise, the concave surface 31b is curved such that the flow channel 30B is made deeper as being closer to the center in the X direction within the range of the convex portion 31. The thickness of the convex portion 31 corresponding to the distance between the convex surface 31a and the concave surface 31b in the Z direction is made gradually thicker as being farther away from the center of the convex portion 31 in the X direction. The side surfaces 33a and 37a are continuously curved with the concave surface 35a positioned therebetween. Similarly, the side surfaces 33b and 37b are continuously curved with the concave surface 31b positioned therebetween.

Figure 9A:
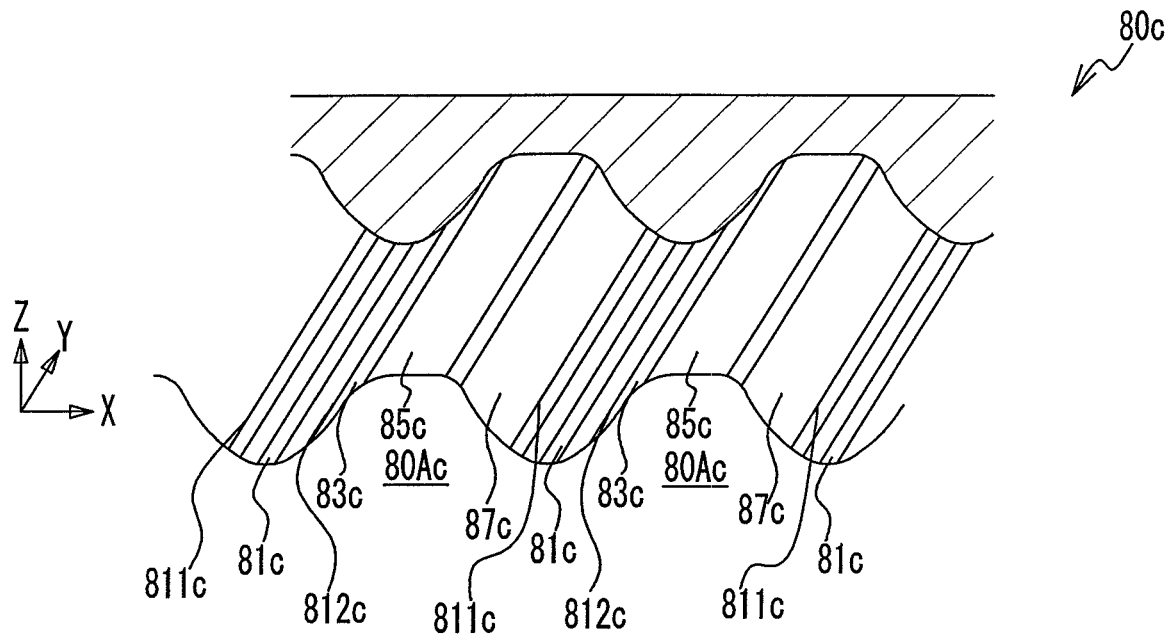
FIGS. 9A and 9B are partially enlarged view of the dies according to the third variation.
Figure 9B:
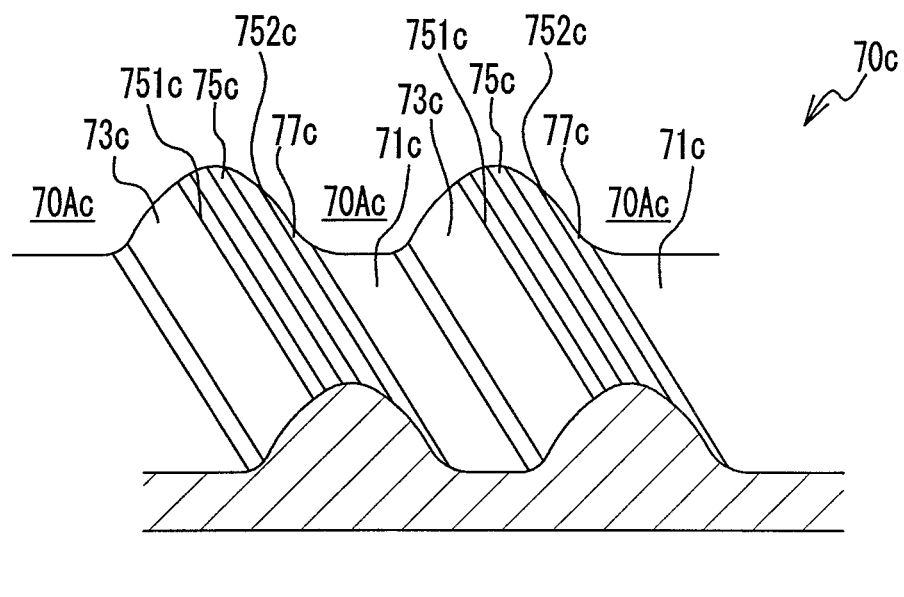
Figure 10A:
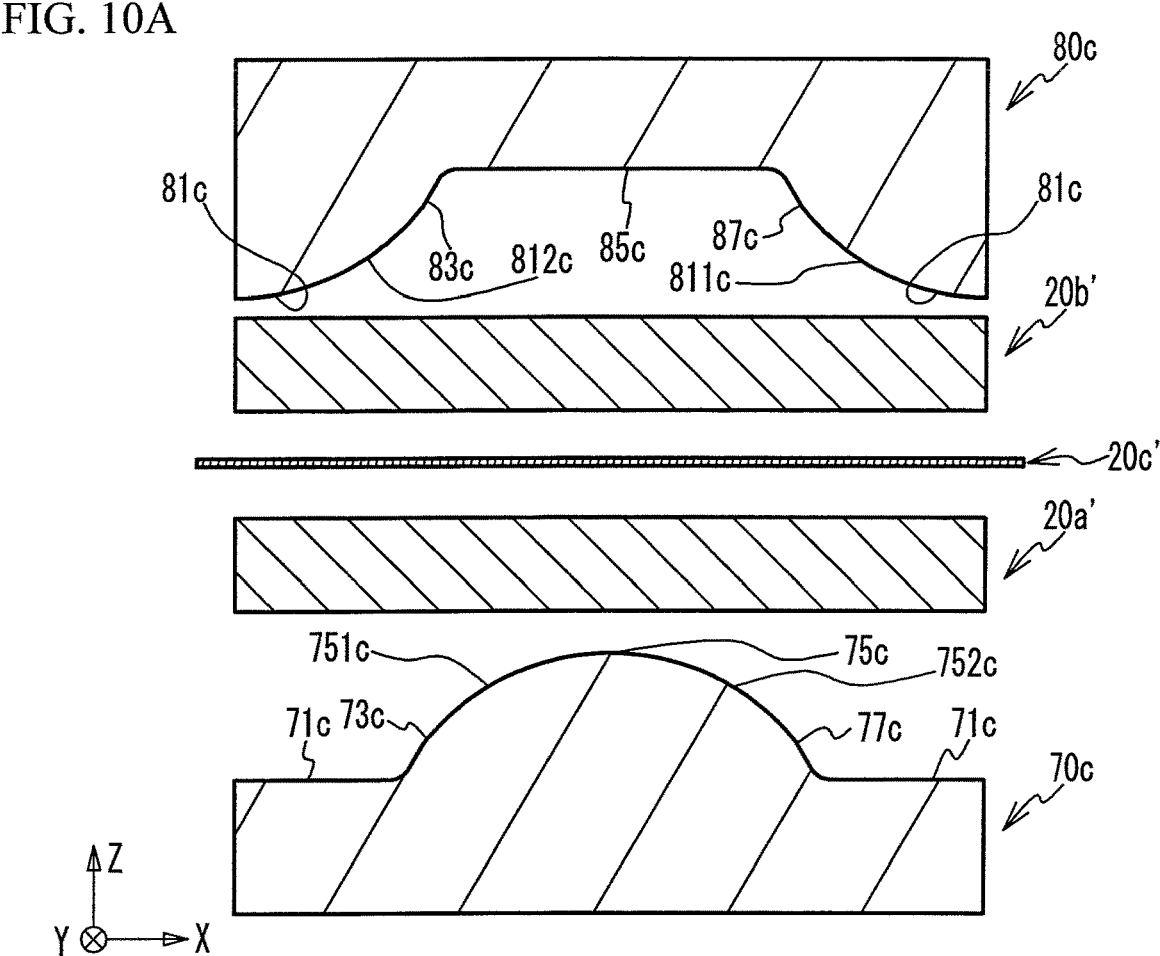
FIGS. 10A and 10B are explanatory views of a method of manufacturing the separator by use of the dies according to the third variation.
Figure 10B:
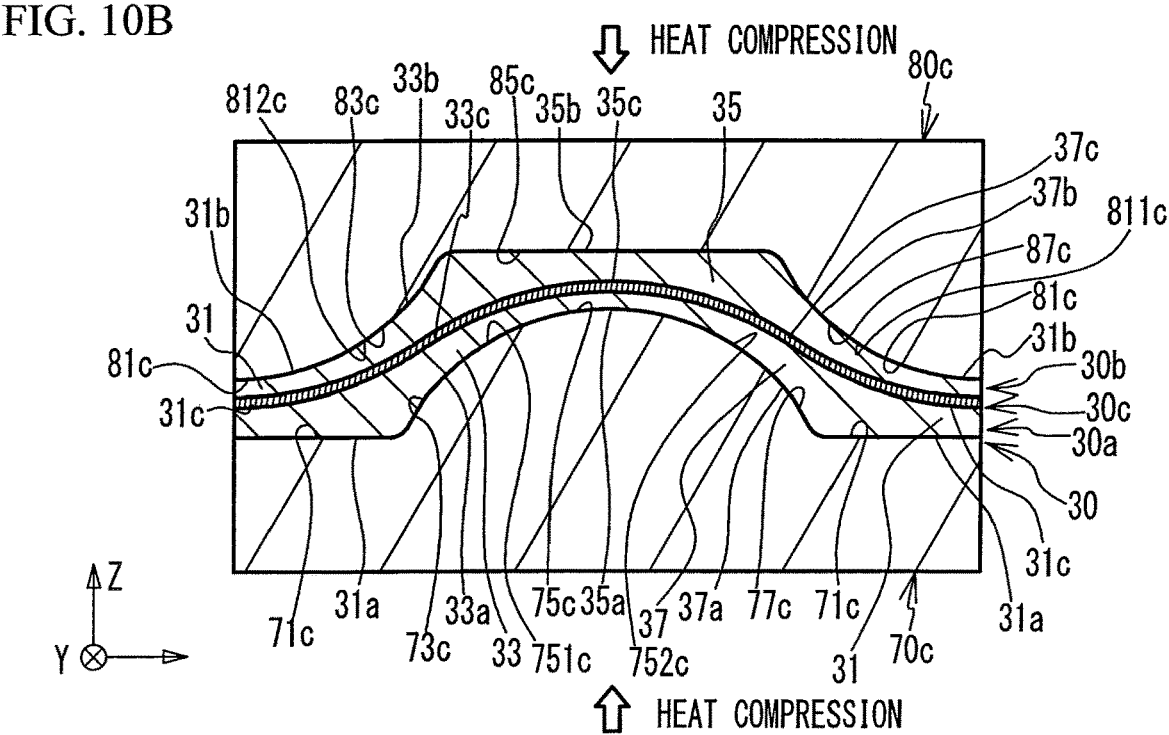

Next, a manufacturing method of the separator 30 will be described. The order of the manufacturing steps of the separator 30 is the same as the order illustrated in FIG. 3, and the description is omitted. FIGS. 9A and 9B are partially enlarged views of dies 80c and 70c according to the third variation. FIGS. 10A and 10B are explanatory views of a method of manufacturing the separator 30 by use of the dies 80c and 70c according to the third variation.

As illustrated in FIG. 9A, a groove 80Ac is defined by a convex surface 81c, a side surface 83c, a concave surface 85c, a side surface 87c, a convex surface 81c . . . formed in this order in the X direction. The convex surface 81c, and the side surfaces 83c and 87c positioned on both sides of the convex surface 81c, are continuously curved. The convex surface 81c protrudes most to a concave surface 71c of the die 70c described later. Similarly, as illustrated in FIG. 9B, a groove 70Ac is defined by a concave surface 71c, a side surface 73c, a convex surface 75c, a side surface 77c, a concave surface 71c . . . formed in this order in the X direction. The convex surface 75c, and the side surfaces 73c and 77c positioned on both sides of the convex surface 75c are continuously curved. The convex surface 75c protrudes most to the concave surface 85c of the die 80c. In addition, the concave surfaces 71c and 85c are substantially parallel to the X direction and flat. The convex surface 81c includes an end portion 811c and an end portion 812c positioned in the +X direction from the end portion 811c. The end portion 811c is a boundary portion between the side surface 87c and the convex surface 81c. The end portion 812c is a boundary portion between the convex surface 81c and the side surface 83c. The convex surface 75c includes an end portion 751c and an end portion 752c positioned in the +X direction from the end portion 751c. The end portion 751c is a boundary portion between the side surface 73c and the convex surface 75c. The end portion 752c is a boundary portion between the convex surface 75c and the side surface 77c. In this variation, the convex surface 81c and the side surfaces 83c and 87c positioned on both sides of the convex surface 81c are continuously curved as described above. However, the end portion 811c is formed at an arbitrary position on a continuously curved surface. For example, when the side surface 87c and the convex surface 81c differ in curvature from each other, the boundary portion in which the curvature changes may be the end portion 811c. The same applies to the end portions 812c, 751c, and 752c.

As described above, the convex surfaces 75c and 81c respectively protrude to the concave surfaces 85c and 71c so as to be curved, and the protruding height at substantially the center in the X direction is the highest. In other words, the convex surface 75c is an example of a portion provided between the end portions 751c and 752c of the convex surface 75c in the direction in which the convex surface 75c and the concave surface 71c are arranged, protruding to the concave surface 85c, and having a protruding height higher than each height of the end portions 751c and 752c of the convex surface 75c. Further, the convex surface 81c is an example of a portion provided between the end portions 811c and 812c of the convex surface 81c in the direction in which the convex surface 81c and the concave surface 85c are arranged, protruding to the concave surface 71c, and having a protruding height higher than each height of the end portions 811c and 812c of the convex surface 81c.

When the hot pressing starts as illustrated in FIGS. 10A and 10B in the state where the resin sheets 20a' and 20b' and the metal plate 20c' are laminated, the convex surface 75c presses the resin sheet 20a' to the die 80c, and the convex surface 81c presses the resin sheet 20b' to the die 70. The resin sheets 20a' and 20b' and the metal plate 20c' are integrally curved along the shapes of the dies 70c and 80c. At this time, the resin sheet 20a' is compressed between the metal plate 20c' and the die 70c, and the resin sheet 20b' is compressed between the metal plate 20c' and the die 80c. Further, it is difficult to deform the metal plate 20c' as compared with the resin sheets 20a' and 20b'. Therefore, the metal plate 20c' is curved between the metal die 70c and 80c so that the deformation amount is as small as possible.

When the dies 70c and 80c are further close to each other, a gap between the convex surface 75c and the metal plate 20c' in the Z direction is made narrow before a gap between the concave surface 71c and the metal plate 20c' in the Z direction is made narrow, and a part of the resin sheet 20a' is preferentially compressed by the convex surface 75c and the metal plate 20c'. The compressed part of the resin sheet 20a' flows to a large gap between the concave surface 71c and the metal plate 20c' in the −X direction from the convex surface 75c through a gap between the side surface 73c and the metal plate 20c', and flows to a large gap between the concave surface 71c and the metal plate 20c' in the +X direction from the convex surface 75c through a gap between the side surface 77c and the metal plate 20c'. This causes the metal plate 20c' to be gently curved along the side surface 73c, the convex surface 75c, and the side surface 77c.

Likewise, a gap between the convex surface 81c and the metal plate 20c' in the Z direction is made narrow before a gap between the concave surface 85c and the metal plate 20c' in the Z direction is made narrow, and a part of the resin sheet 20b' is preferentially compressed by the convex surface 81c and the metal plate 20c'. A part of the compressed resin sheet 20b' flows to a large gap between the concave surface 85c and the metal plate 20c' in the +X direction through a gap between the side surface 83c and the metal plate 20c', and flows to a large gap between the concave surface 85c and the metal plate 20c' in the −X direction through a gap between the side surface 87c and the metal plate 20c'. This causes the metal plate 20c' to be gently curved continuously along the convex surface 81c, the side surface 83c, the concave surface 85c, and the side surface 87c. The entire metal plate 20c' is gently curved in this manner, and the convex region 31c, the side region 33c, the convex region 35c, and the side region 37c of the metal plate 30c are continuously curved as illustrated in FIG. 10B. This can suppress a partial increase in curvature of the metal plate 30c, and a decrease in stiffness thereof. Further, the resin sheets 20a' and 20b' are deformed and compressed to form the resin layers 30a and 30b illustrated in FIG. 10B. In addition, reference numerals are omitted in FIG. 10B.

As described above, the convex portions 31 and 35 illustrated in FIG. 8 are compressed before the side portions 33 and 37 in the hot pressing, thereby increasing the density of the conductive particles in the convex portions 31 and 35 of the resin layers 30a and 30b. Herein, one of the convex portions 31 and 35 respectively come into contact with the diffusion layer and another separator of another unit cell, thereby suppressing an increase in electrical resistance at the contacting point.

The side surfaces 73c, 77c, 83c, and 87c are curved, but at least one of them may be flat. Also, the convex surfaces 75c and 81c are preferably smoothly curved in consideration of a decrease in pressure loss of fluids flowing along the flow channels 30A and 30B, but the present invention is not necessarily limited to this, for example, it may be curved to have a polygonal shape.

The separator manufactured by the above manufacturing method is not limited to a water-cooled type fuel cell using a liquid as a coolant, and may be adopted in, for example, an air-cooled fuel cell using air as a coolant. The step of "preparing" in the above manufacturing method only needs to prepare an object at the time of performing the above manufacturing method. For example, even the case where manufacturing the object is included in "preparing". The object may be prepared by any process, such as purchasing the object from others.

Although some embodiments of the present invention have been described in detail, the present invention is not limited to the specific embodiments but may be varied or changed within the scope of the present invention as claimed.

What is claimed is:

1. A manufacturing method of a separator for a fuel cell, comprising:

preparing a first die including: a first convex surface and a first concave surface; and a first side surface connected between the first convex surface and the first concave surface;

preparing a second die including: a second concave surface and a second convex surface respectively facing the first convex surface and the first concave surface; and a second side surface facing the first side surface and connected between the second concave surface and the second convex surface;

preparing a metal plate having a flat plate shape, and two electro-conductive resin sheets; and forming a flow channel in the metal plate and the two electro-conductive resin sheets by only one step of hot pressing with the first and second dies in a state where one of the electro-conductive resin sheets is set at one side of the metal plate and the other one of the electro-conductive resin sheets is set at the other side of the metal plate, wherein the first convex surface includes a first portion provided between both end portions of the first convex surface in a direction in which the first convex surface and the first concave surface are arranged, protruding to the second concave surface, and having a protruding height higher than each height of the both end portions of the first convex surface, wherein an exterior angle between the first concave surface and the first side surface is larger than 90 degrees and less than 180 degrees, wherein an exterior angle between the second concave surface and the second side surface is larger than 90 degrees and less than 180 degrees, and wherein the second convex surface includes a second portion provided between both end portions of the second convex surface in a direction in which the second convex surface and the second concave surface are arranged, protruding to the first concave surface, and having a protruding height higher than each height of the both end portions of the second convex surface.

2. The manufacturing method of the separator for the fuel cell of claim 1, wherein the first portion protrudes from a part of the first convex surface to the second concave surface.

3. The manufacturing method of the separator for the fuel cell of claim 2, wherein the first portion is positioned at a center of the first convex surface in the direction in which the first convex surface and the first concave surface are arranged.

4. The manufacturing method of the separator for the fuel cell of claim 2, wherein a plurality of the first portions are provided on the first convex surface, and the first portions are arranged in the direction in which the first convex surface and the first concave surface are arranged.

5. The manufacturing method of the separator for the fuel cell of claim 1, wherein the first portion is curved such that the protruding height is higher than each height of the both end portions.

6. The manufacturing method of the separator for the fuel cell of claim 5, wherein the first side surface is curved continuously to the first portion.

7. The manufacturing method of the separator for the fuel cell of claim 5, wherein a center of the first convex surface of the first portion in the direction in which the first convex surface and the first concave surface are arranged protrudes most to the second concave surface.

* * * * *